United States Patent [19]

Jung et al.

[11] Patent Number: 5,569,632
[45] Date of Patent: Oct. 29, 1996

[54] COMPOSITIONS OF HIGH FREQUENCY DIELECTRICS

[75] Inventors: Hyung J. Jung, Kyonggi-do; Hyun J. Kim, Seoul; Kyong Y. Kim, Seoul; Seok J. Yoon, Seoul; Sang O. Yoon, Kangwon-do, all of Rep. of Korea; Tetsuro Nakamura; Mitsuru Itoh, both of Yokohama, Japan; Yoshiyouki Inaguma, Yamato, Japan

[73] Assignee: Korea Institute of Science and Technology, Seoul, Rep. of Korea

[21] Appl. No.: 488,827

[22] Filed: Jun. 9, 1995

[30] Foreign Application Priority Data

Jun. 30, 1994 [KR] Rep. of Korea ............... 94-15400

[51] Int. Cl.$^6$ ............................................. C04B 35/465
[52] U.S. Cl. .............................. 501/136; 501/135
[58] Field of Search ............................. 501/136, 135

[56] References Cited

U.S. PATENT DOCUMENTS

| | | | |
|---|---|---|---|
| 4,405,473 | 9/1983 | Murase et al. | 501/136 |
| 4,545,929 | 10/1985 | Masuyama et al. | 501/136 |

FOREIGN PATENT DOCUMENTS

| | | | |
|---|---|---|---|
| 60-107804 | 6/1985 | Japan | 501/136 |
| 3-008765 | 1/1991 | Japan | C04B 35/460 |
| 3-008767 | 1/1991 | Japan | C04B 35/460 |
| 2219287 | 12/1989 | United Kingdom | C04B 35/460 |

OTHER PUBLICATIONS

J. Am. Ceram. Soc., 71 [1] C-11-C-17, 1988, S. Nishigaki, et al., "BaO-TiO2-WO3 Microwave Ceramics and Crystalline BaWO4".

Hi-Tech Report, pp. 114-118, Sep. 1991, J. Kato, "Material Produces Small Resonators With High Dielectric Constant".

IEEE Cat., No. CH2358-0/86/0000-0118, pp. 118-121, 1986, K. Matsumoto, et al., "Ba(Mg1/3Ta2/3)O3 Ceramics With Ultra-Low Loss at Microwave Frequencies".

Journal of the American Ceramic Society, vol. 67, No. 4, pp. 278-281, 1984, K. Wakino, et al., "Microwave Characteristics of (Zr,Sn)TiO4 and BaO-PbO-Nd2O3-TiO2 Dielectric Resonators".

J. Am. Ceram. Soc., vol. 73, No. 6, pp. 1599-1605, 1990, Jenn-Ming WU, et al., "Reaction Sequence and Effects of Calcination and Sintering on Microwave Properties of [Ba, Sr]O-Sm2O3-TiO2 Ceramics".

Primary Examiner—Anthony Green
Attorney, Agent, or Firm—Oblon, Spivak, McClelland, Maier & Neustadt, P.C.

[57] ABSTRACT

The present invention provides compositions of high frequency dielectric ceramics represented by the following formula:

$$(1-y)\ SrTiO_3 - y\ La(Zn_{1-x/2}Mg_{x/2}Ti_{1/2})O_3$$

wherein $0 \leq x \leq 0.99$; and $0.4 \leq y \leq 0.9$. The compositions have a dielectric constant of about 28 to about 60, $Qxf_0$ (GHz) of about 25,000 to about 71,000 and a temperature coefficient of the resonant frequency of about −56 to about 84 ppm/°C. The compositions may be applied to various communications systems which require high frequency dielectric ceramics.

1 Claim, 2 Drawing Sheets

5,569,632

COMPOSITIONS OF HIGH FREQUENCY DIELECTRICS

BACKGROUND OF THE INVENTION

1. Field of the Invention

The present invention relates to a novel composition of high frequency dielectric ceramics. More particularly, the present invention relates to compositions of high frequency dielectric ceramics having high Q values, high dielectric constants, and low temperature coefficients of the resonant frequency.

2. Description of the Prior Art

Recently, various communication systems using microwave frequencies with a range of 300 MHz to 300 GHz have been developed. These include mobile radio communication systems such as wireless telephone sets, carphones, satellite broadcasting systems, satellite communication systems and the like. Such systems require high frequency dielectric ceramics applicable to resonators, band-pass (or rejection) filters, microwave integrated circuits (MICs) and the like, and demand for such components has greatly increased. A high frequency dielectric ceramics to be applied to such communication systems should have the following characteristics: (1) a high dielectric constant, which is required for miniaturization of parts made of dielectric ceramics because the wavelength of microwaves within dielectric ceramics is inversely proportional to the square root of the dielectric constant; (2) a high Q value corresponding to a reciprocal of the dielectric constant, which is required for high performance because dielectric loss is directly proportional to frequency; and (3) a low temperature coefficient of the resonant frequency of a dielectric resonator. See, W. Wersing, "Electronic Ceramics", B.C.H Steele ed., p. 67, Elsevier Sci. Pub. Co., New York (1991). In addition, high frequency dielectric ceramics to be applied to such communication systems should have a small change in properties with time, high thermal conductivity, and good mechanical strength.

Examples of dielectric ceramics which have been heretofore developed include a $Ba(M^{+2}_{1/3}M^{+5}_{2/3})O_3$ system wherein $M^{+2}$ is Mg or Zn, and $M^{+5}$ is Ta or Nb, a $Ba_2Ti_9O_{20}$ system, and a $(Zr,Sn)TiO_4$ system. These types of dielectric ceramics have low dielectric losses, while they have dielectric constants less than about 40. Other examples include a $BaO-Sm_2O_3-TiO_2$ system, a $(Ba,Pb)O-Nd_2O_3-TiO_2$ system, and a $(Pb,Ca)ZrO_3$ system. These types of dielectric ceramics have dielectric constants of not less than about 80, while they have relatively high dielectric losses, for example $Qxf_0$ (GHz)<about 10,000. See, W. Wersing supra and J. Kato, JEE, Sep., pp. 114–118 (1991).

Generally, dielectric materials having high dielectric constants exhibit an increased dielectric loss and a temperature coefficient of the resonant frequency due to the dipoles and the defects associated therewith. However, for most applications of high frequency dielectric ceramics, they must have stable temperature coefficients of the resonant frequency.

$SrTiO_3$ has a very high dielectric constant of about 255 at 2 GHz, but has a very high temperature coefficient of the resonant frequency of about +1,670 ppm/° C. $La(Zn_{(1-x)/2}Mg_{x/2}Ti_{1/2})O_3$ has a very high $Qxf_0$(GHz) of about 80,000 to about 91,000 and a low temperature coefficient of the resonant frequency ranging from about −55 to about −70 ppm/° C., but has a low dielectric constant of about 28 to about 31.

SUMMARY OF THE INVENTION

It is therefore an object of the invention to provide compositions of high frequency dielectric ceramics having high dielectric constants and low dielectric losses.

It is another object of the invention to provide compositions of high frequency dielectric ceramics having controllable temperature coefficients of the resonant frequency.

Other objects and advantages of the invention will become apparent through the remainder of the specification.

DETAILED DESCRIPTION OF THE INVENTION

We, the inventors of the present invention, have conducted an intensive investigation to develop compositions of high frequency dielectric ceramics. As a result, it has been unexpectedly discovered that a certain class of compositions of high frequency dielectric ceramics show high Q value, high dielectric constant and low temperature coefficient of the resonant frequency.

In accordance with one embodiment of the invention, new compositions of high frequency dielectric ceramics are provided as represented by the following formula:

$$(1-y)\,SrTiO_3 - y\,La(Zn_{(1-x)/2}Mg_{x/2}Ti_{1/2})O_3$$

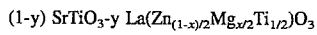

wherein $0 \leq x \leq 0.99$; and $0.4 \leq y \leq 0.9$.

The compositions of dielectric ceramics according to the present invention have dielectric constants of about 28 to about 60, $Qxf_0$ (GHz) of about 25,000 to about 71,000, and temperature coefficients of the resonant frequency of about −56 to about +84 ppm/° C.

The compositions of high frequency dielectric ceramics according to the present invention are certain kinds of perovskite-type solid solutions, which comprise $SrTiO_3$, $La(Zn_{1/2}Ti_{1/2})O_3$, and $La(Mg_{1/2}Ti_{1/2})O_3$. The compositions of high frequency dielectric ceramics of the invention have a temperature coefficient of the resonant frequency of about −56 to about +84 ppm/° C. These temperature coefficients can be controlled to about ±10 ppm/° C. by including small amounts of certain additives. Thus, the compositions of high frequency dielectric ceramics according to the invention can provide microwave dielectric ceramics having a low dielectric loss and good temperature properties by itself or by changing the additives. Therefore, the compositions of the invention can be properly applied to various communication systems requiring high frequency dielectric ceramics.

Figure 1:
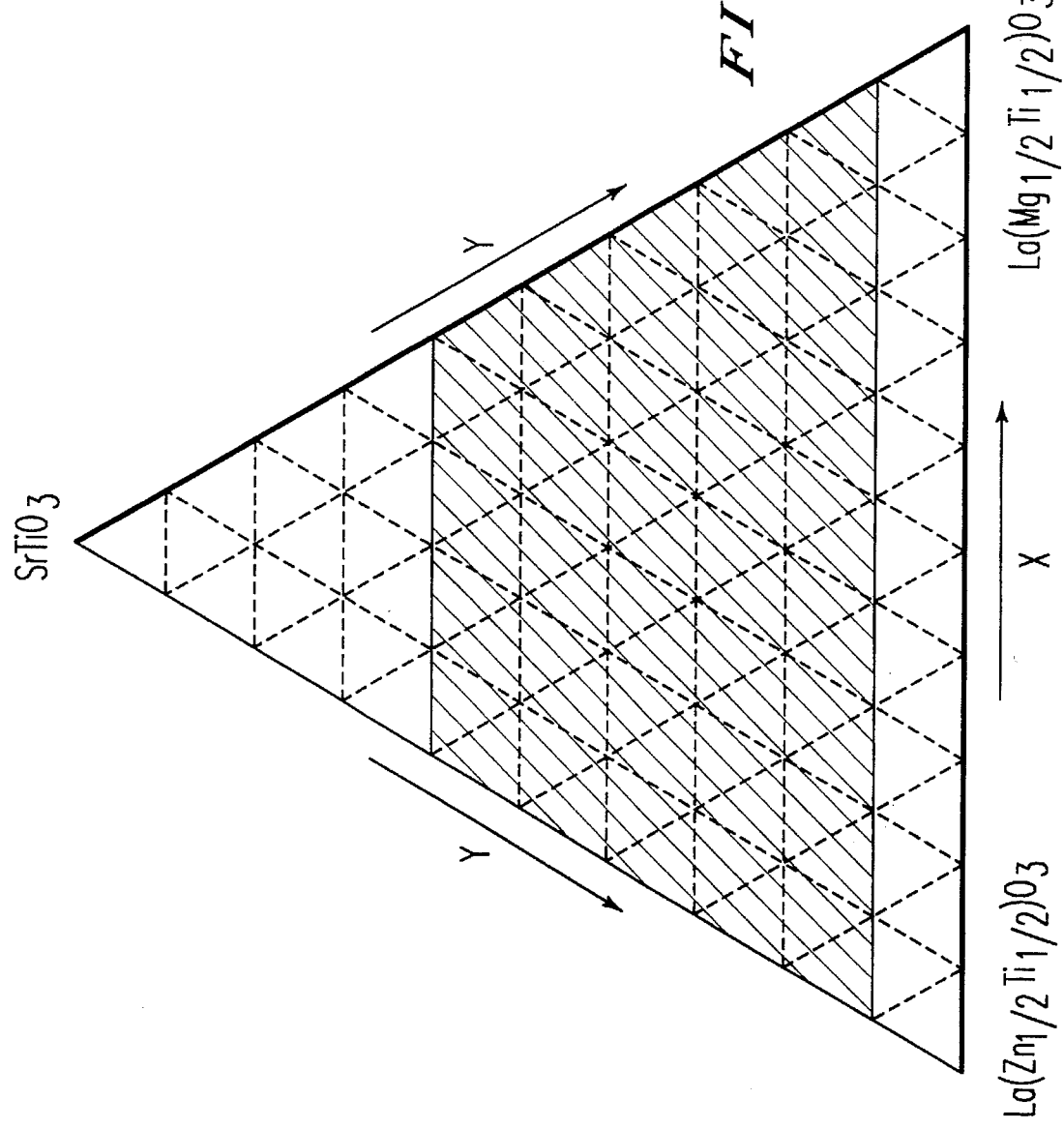
FIG. 1 shows a composition of each component of the compositions according to the present invention.
Figure 2:
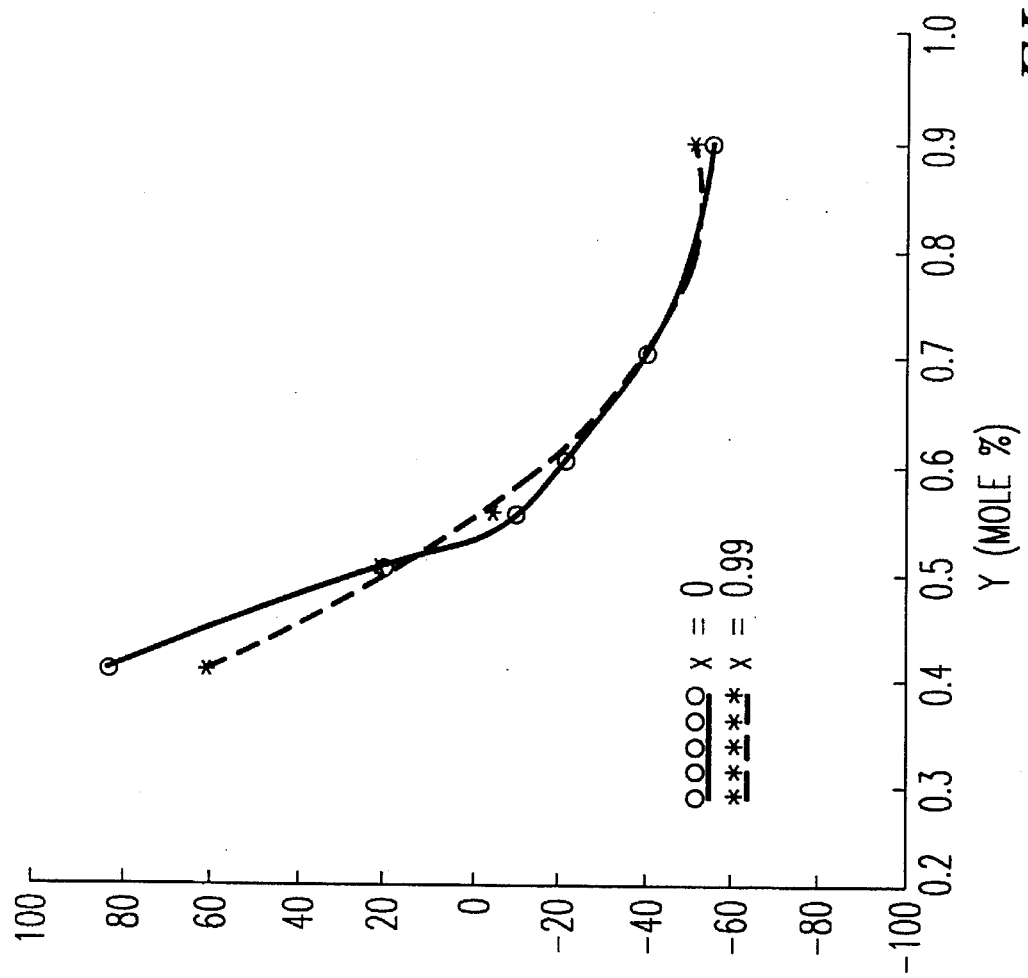
FIG. 2 shows a graph showing a change of a temperature coefficient of the resonant frequency of the compositions according to the present invention with time.

The properties of the compositions of high frequency dielectric ceramics according to the present invention may vary depending on the amount of $SrTiO_3$. Increasing the amount of $SrTiO_3$ contained in the compositions increases the dielectric constants of the compositions in a range of about 30 to about 60, $Qxf_0$ (GHz) values are greatly decreased, and temperature coefficients of the resonant frequency gradually vary from negative (−) to positive values (+) as shown in FIG. 2. Particularly, the compositions which contain $SrTiO_3$ in the amount of about 0.45 mole % can provide microwave dielectric ceramics having a dielectric constant of about 42 to about 47, $Qxf_0$ of about more than 36,000, and a temperature coefficient of the resonant frequency of about less than 10 ppm/° C.

The compositions of high frequency dielectric ceramics according to the invention are prepared from $SrCO_3$, $La_2O_3$, $TiO_2$, ZnO, and MgO as starting materials, according to known methods for the preparation of high frequency dielectric ceramics.

For example, $SrCO_3$, $La_2O_3$, $TiO_2$, ZnO, and MgO are mixed in a proper proportion. The resulting powder mixture is calcined in air under suitable conditions, for example, for about 10 hours at a temperature of about 1,050° C., and then milled. The primarily calcined mixture was re-calcined at a temperature of about 1,200° to about 1,300° C. for a sufficient period, for example, for about 6 hours. After thorough milling, the calcined powder is pressed into a disc having a diameter of about 10 mm and a thickness of about 1 to about 2 mm. The disc-type specimen is sintered in air under suitable conditions, for example, for a period of about 2 to about 6 hours at a temperature of about 1,500° to about 1,650° C., to give a high frequency dielectric ceramic having the desired composition. Higher sintering temperatures are required as the content of MgO increases. The specimen shrinks by about 12 to about 20% during sintering.

The dielectric properties, such as dielectric constant, Q value, and temperature coefficient of resonant frequency, of the sintered specimen are determined by a known dielectric resonator method. See M. Onoda, J. Kuwata et al., *Jpn. J. Appl. Phys.*, 21 (12), 1707, (1982).

DESCRIPTION OF THE PREFERRED EMBODIMENT

The present invention will be further explained in detail by way of the examples which are intended to be illustrative and not limiting.

EXAMPLE $SrCO_3$, $La_2O_3$, $TiO_2$, ZnO and MgO, each of which has a purity of above 99.9%, were weighed in a given ratio indicated in Table 1, and mixed. The powder mixtures were calcined for about 10 hours at a temperature of about 1,050° C. in air. The resulting calcined powders were milled and further re-calcined at a temperature of about 1,200° to about 1,300 ° C. for about 6 hours.

The resulting powders were thoroughly milled. The milled powders were pressed into a disc having a diameter of about 10 mm and a thickness of about 1 to about 2 mm. The disc-type specimens were sintered for about 2 to about 6 hours at a temperature of about 1,500° to about 1,650° C. in air. The sintering temperatures were increased with increasing the content of MgO. The specimens shrunk by about 12 to about 20% during sintering.

Both sides of the sintered specimens were thoroughly polished with abrasive paper (up to #3000) and introduced into a waveguide.

Dielectric constants, Q values and temperature coefficients of the resonant frequency of the specimens were measured at a frequency range of 8 to 12 GHz and a temperature range of −15° to 85° C. according to a dielectric resonator method mentioned. The microwave dielectric properties of each specimen are shown in Table 1.

TABLE 1

High Frequency Dielectric Properties of
(1-y) $SrTiO_3$-y $La(Zn_{(1-x)/2}Mg_{x/2}Ti_{1/2})O_3$ system.

| Sample No. | Composition (mole %) x | y | Dielectric Constant (εr) | $Qxf_0$ (GHz) | TCF (ppm/°C.) |
|---|---|---|---|---|---|
| 1 | 0 | 0.4 | 60.3 | 25050 | 83.68 |
| 2 | 0 | 0.5 | 49.2 | 30130 | 20.35 |
| 3 | 0 | 0.55 | 46.5 | 36220 | −9.84 |
| 4 | 0 | 0.6 | 43.8 | 42250 | −21.35 |
| 5 | 0 | 0.6 | 35.4 | 64530 | −40.4 |
| 6 | 0 | 0.7 | 31.9 | 71000 | −55.5 |
| 7 | 0.25 | 0.4 | 58.7 | 30220 | 77.62 |
| 8 | 0.25 | 0.5 | 47.9 | 31140 | 20.48 |
| 9 | 0.25 | 0.55 | 45.8 | 37750 | −8.26 |
| 10 | 0.25 | 0.6 | 42.7 | 45850 | −20.84 |
| 11 | 0.25 | 0.7 | 35.2 | 64180 | −39.37 |
| 12 | 0.25 | 0.9 | 30.6 | 69730 | −55.5 |
| 13 | 0.5 | 0.4 | 56.2 | 35200 | 71.24 |
| 14 | 0.5 | 0.5 | 47.1 | 32140 | 21.45 |
| 15 | 0.5 | 0.55 | 44.6 | 39280 | −6.484 |
| 16 | 0.5 | 0.6 | 41.9 | 49450 | −20.86 |
| 17 | 0.5 | 0.7 | 34.7 | 63860 | −40.60 |
| 18 | 0.5 | 0.9 | 29.8 | 68460 | −54.37 |
| 19 | 0.75 | 0.4 | 54.2 | 40280 | 65.63 |
| 20 | 0.75 | 0.5 | 46.4 | 32840 | 21.56 |
| 21 | 0.75 | 0.55 | 43.8 | 40820 | −5.48 |
| 22 | 0.75 | 0.6 | 40.7 | 54060 | −20.93 |
| 23 | 0.75 | 0.7 | 34.4 | 63530 | −40.14 |
| 24 | 0.75 | 0.9 | 30.3 | 67730 | −52.87 |
| 25 | .99 | 0.4 | 51.8 | 45360 | 60.90 |
| 26 | .99 | 0.5 | 44.9 | 33540 | 21.53 |
| 27 | .99 | 0.55 | 42.6 | 42350 | −4.23 |
| 28 | .99 | 0.6 | 39.9 | 58660 | −21.01 |
| 29 | .99 | 0.7 | 34.3 | 63200 | −39.20 |
| 30 | .99 | 0.9 | 28.2 | 67000 | −51.30 |

What is claimed is:

1. A high frequency dielectric ceramic composition represented by the following formula:

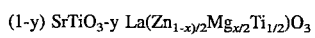

(1-y) $SrTiO_3$-y $La(Zn_{1-x/2}Mg_{x/2}Ti_{1/2})O_3$ wherein $0 \leq x \leq 0.99$; and $0.4 \leq y \leq 0.9$.

* * * * *